United States Patent Office 2,713,252
Patented July 19, 1955

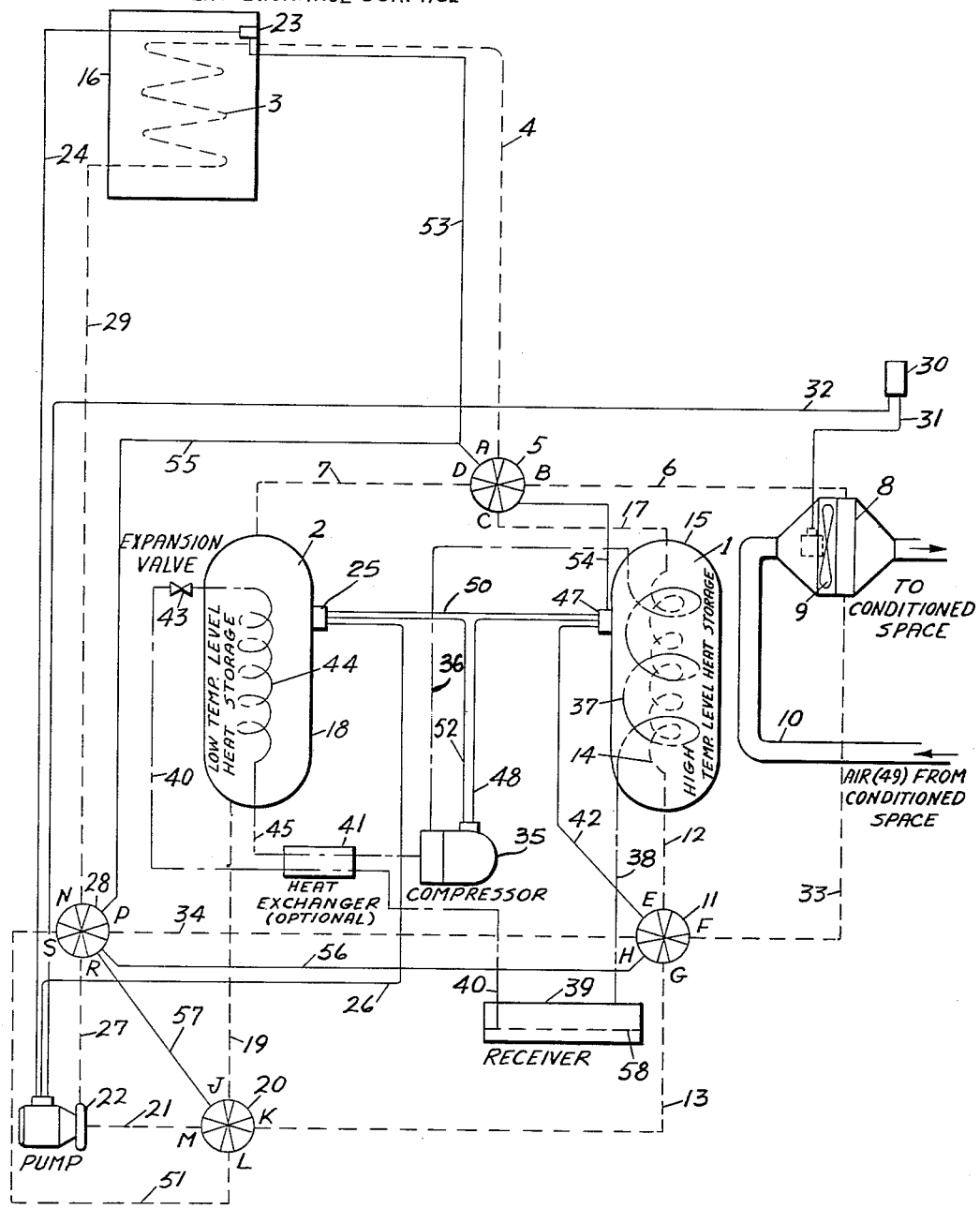

2,713,252

TEMPERATURE CONTROL SYSTEM

Thomas S. Jackson, Hopkinton, and John R. Swanton, Jr., Newton, Mass., assignors to Arthur D. Little, Inc., Cambridge, Mass., a corporation of Massachusetts Application May 7, 1952, Serial No. 286,536

10 Claims. (Cl. 62—6)

This invention relates to the control of temperature of dwellings and other buildings and is directed, in particular, to heating or cooling such buildings by means of a system comprising as its principal elements a heat pump, an outdoor heat exchange surface, and a multi-stage heat storage system.

This invention makes possible the heating of dwellings and other buildings without the use of coal, oil, gas or other fuels (including electricity used for direct heating). This invention also makes possible the cooling of dwellings and other buildings without the necessity for a substantial investment in additional equipment.

Furthermore, this invention permits this year-round air heating and air cooling at low operating cost. Additional advantages with respect to the heating phase of this invention include elimination of such problems as fuel delivery and waste disposal, combustion odors, air pollution and contamination.

The purposes of this invention are accomplished by combining a heat pump, an outdoor heat exchange surface, and a multi-stage heat storage system.

The heat pump is of conventional type, employing a compressible heat transfer fluid of suitable type such as one of the halogenated lower-aliphatic hydrocarbons. Many heating systems employing a heat pump, in some instances in conjunction with single-stage heat storage, have been designed and operated. These have proved competitive with other systems using standard heating fuels where power costs are extremely low, or where special conditions permit heat collection at a relatively high temperature. Since these conditions do not generally prevail, such heat pump systems have not met wide acceptance. For an equivalent heat load, this invention makes possible the use of a smaller heat pump than would otherwise be required for heating, with consequent savings in cost. This smaller heat pump is still adequate for summer cooling, since it is used in conjunction with thermal storage and an extensive surface for dissipating heat by radiation provided (normally at night) by the outdoor heat exchange surface.

The outdoor exchange surface may possess some of the features of the solar heat trap as described in Patent No. 2,544,474 issued March 6, 1951, to John R. Swanton, Jr., one of the present applicants. This heat exchanger consists of a passage or series of passages through which a fluid is circulated. Heat is transferred to or from this fluid by radiation, conduction or convection, or any combination thereof. When used in the present invention, the exchanger surfaces may be shielded against heat loss. If shields are used, these may be, for example, transparent or translucent covers, or vanes arranged as windbreaks or both. Outdoor heat exchangers acting as solar heat traps have been designed and operated for heating dwellings in connection with single-stage thermal storage. These systems require direct transfer of thermal energy at temperatures above desired indoor temperatures, and hence require frequent collection of solar energy at low efficiencies during the peak of the heating season. This invention makes possible the more efficient collection of solar energy than would otherwise be possible. For an equivalent heat load, a smaller size heat trap is required with consequent savings in cost.

This outdoor heat exchange surface in addition to its function as a solar heat trap is also designed to function as a collector of heat at ambient temperatures during the heating cycle and as a dissipator of heat during the cooling cycle.

The multi-stage heat storage system consists in its simplest form of two well-insulated containers of substances at two temperature levels. During the heating cycle, the temperature of the substance (hereinafter referred to as material 1) in one container is maintained above the desired indoor temperature and serves as the principal heat source for the space to be heated. The temperature of the other substance (hereinafter referred to as material 2) is somewhat lower, and serves as the heat source for the heat pump.

During the cooling cycle, material 1 serves as the heat sink for the heat pump. Material 2 serves as the cooling medium for the space to be cooled.

Solar heating and heat pump systems employing thermal storage have been designed and operated at the higher temperature levels required for direct heating. During much of the heating season, it is not possible to collect a large proportion of the total solar energy available because of the required high temperature level of collection. Therefore, during periods of high solar radiation, it is necessary to collect and store large amounts of heat, with consequent need for large quantities of high temperature storage materials. This invention retains the feature of direct collection during periods of high solar radiation, but eliminates the need for excessive storage over long periods of time, with consequent savings in cost of storage material and space required.

Material 1 of this invention is advantageously the same as the heat storage medium or material described in U. S. Patent No. 2,544,474. This medium has a heat of fusion which is high with respect to its volume, and a melting or transition point sufficiently above normal room temperature to permit efficient heat transfer. It is stable under the conditions of operation in the system of this invention, is substantially inert toward the equipment with which it is used, and is relatively inexpensive. This heat storage medium should have a transition point (liquid to solid and vice versa) of at least 85° F. for ordinary house heating, or more generally, it should have a transition point of at least 10° F. and preferably at least 15° F. above the desired temperature of the dwelling or other space to be heated. The latent heat of fusion of the heat storage medium should be substantial, at least about 60 gram calories per cubic centimeter. A substance which may be taken as an example of such a heat transfer storage medium is hydrated disodium orthophosphate, $Na_2HPO_4.12H_2O$.

During the cooling cycle, this material 1 serves as a heat sink whenever the heat pump is in operation.

Material 2 is never at a higher temperature level than material 1. One of the functions of material 2 is the storing of part or all of the thermal energy available from the outdoor heat exchange surface during the heating cycle, but available at a temperature normally too low to permit storage at the high temperature level.

Material 2 may also be the means for conducting heat collected or dissipated by the outside heat exchange surface. In this case, the material is a fluid, either liquid or gas, which may or may not pass through a physical transition over the temperature range to which it is exposed, and which is stable under the conditions of operation in the system of this invention, is substantially inert toward the equipment with which it is used, and is relatively inexpensive. One compound which may be taken as an example of this lower temperature level heat storage and transfer medium is water, with or without antifreeze added, depending upon the temperatures to which it is exposed.

This invention will now be described in more detail by reference to the accompanying schematic flow sheet, which is to be considered as illustrative of a preferred form of the invention, but not as limiting it in any way other than as expressed in the accompanying claims.

In the subsequent description of this invention, reference is made to various temperature conditions, which are designated and described in the following table. Where actual degrees F. are indicated, these may be varied more or less according to choice. The other temperatures will, of course, depend on materials selected (e. g. $T_3$), weather conditions (e. g. $T_0$), operating condtions (e. g. $T_1$), personal preference (e. g. $T_{10}$), and other factors.

$T_0$ = temperature of heat transfer fluid leaving outdoor heat exchange surface
$T_1$ = temperature of high temperature level heat storage material (material 1)
$T_2$ = temperature of low temperature level heat storage material (material 2) while in its storage container
$T_3$ = fusion point of high temperature level heat storage material (material 1)
$T_4$ = lowest value of temperature $T_2$ permitting compressor operation, unless $T_1$ is at least 5° below $T_3$
$T_5$ = predetermined high-limit value of temperature $T_2$ during cooling cycle
$T_6$ = predetermined low-limit value of temperature $T_2$ during cooling cycle
$T_7$ = $T_1$ plus at least 5° F.
$T_8$ = $T_3$ minus at least 5° F.
$T_9$ = highest storage temperature for either material 1 or material 2
$T_{10}$ = desired room temperature minus about 5° F.
$T_{11}$ = actual room temperature
$T_{12}$ = $T_3$ plus at least 5° F.

Fig. 1 is a flow sheet showing diagrammatically one possible arrangement of the system of this invention and its operation during the heating and cooling cycles. The various parts shown in Fig. 1 comprise an outdoor heat exchange surface 16 with coils 3, as hereinafter described; heat exchanger 8 (such as a radiator) for regulating the temperature of the air in the building; insulated container 15 for high temperature level heat storage material (e. g. material 1); insulated container 18 which is a reservoir for the circulating low temperature level heat storage material (e. g. material 2); and pump 22 for circulating the latter material through various parts of the circuit indicated by the dash lines. The path or paths of this circulation are determined by the settings of several four-way valves (5, 11, 20, and 28) which may be operated manually or actuated by thermoswitches (e. g. 23, 25, 30, 47) or other thermally operated controls. Also shown in Fig. 1 is a heat pump cycle indicated by dot-dash lines and comprising a compressor 35, a receiver or storage reservoir 39, a heat exchanger 41 (optional), and an expansion valve 43. The compressible heat transfer fluid, represented by the numeral 58, flows through this cycle. Circulation in this cycle is controlled by thermoswitches 25 and 47. Container 18 is provided with a coil 44 wherein the compressible fluid 58 flowing in the heat pump cycle is brought into out-of-contact heat exchange relation with the low temperature level heat storage material 2. Container 15 is provided with coils 14 and 37 wherein the low temperature level heat storage material 2 and the compressible fluid 58 flowing in the heat pump cycle, respectively, are brought into out-of-contact heat exchange relation with each other and with the high temperature level heat storage material 1.

The heating cycle will now be described, after which the cooling cycle will be described.

Through coils 3 of outdoor heat exchange surface 16 flows a suitable heat transfer fluid which in the case of this example is also the low temperature level heat storage material 2. From coils 3 conduit 4 leads to valve 5 in the building to be heated; valve 5 is arranged to direct the said heat transfer fluid into either conduit 6 when the exit temperature (hereinafter referred to as $T_0$) of said fluid at the outdoor heat exchange surface 16 is at a temperature level (hereinafter referred to as $T_7$) greater than $T_1$ by some specified amount, such as at least 5° F., or into conduit 7 when equal to or below $T_7$. The direction of flow is controlled by thermoswitches 23 and 47 through connections 53, 54, 55, 56 and 57. When $T_0$ is greater than $T_7$, the following courses are open for flow of said heat transfer fluid: Valves 5A–B, 11F–E, 5C–D, 20J–M, 28R–N. When said material 2 passes through valve 5A–B, it flows through conduit 6 to heat exchanger 8 for warming the indoor air. Heat is delivered by this heat exchanger 8 when required, by the action of thermoswitch 30 controlling operation of fan 9 through connection 31. The incoming air 49 is brought in by duct 10 from the various sections to be heated. Material 2 then flows via conduit 33 to valve 11F–E whence it is conducted via conduit 12 into heat exchanger coil 14 delivering heat to material 1 in a container 15. This container holds the high temperature heat storage material 1 of a type described above, and may be a single container or a plurality of smaller units which are in out-of-contact heat exchange relation with coil 14. Coil 14 leads into conduit 17 which connects via valve 5C–D through conduit 7, which carries material 2 into container 18 and delivers heat thereto. Material 2 is then conducted by conduit 19 via valve 20J–M through conduit 21 to circulating pump 22 which is controlled by thermoswitches 23 and 25 by connections 24 and 26 respectively. When the temperature at thermoswitch 23 ($T_0$) exceeds the temperature at thermoswitch 25 ($T_2$), the pump is actuated through connections 53 and 26 and circulates fluid 2 through conduit 27 via valve 28R–N through conduit 29 back to the outdoor heat surface 16, to begin its cycle over again. When $T_0$ falls to or below $T_2$, the pump is shut off and circulation through outdoor heat exchange surface 16 stops. In any event, thermoswitch 25 stops the pump 22 whenever $T_2$ in container 18 exceeds a selected high value, hereinafter referred to as $T_9$, for example 120° F. Such a temperature occurs when the heat storage facilities have been utilized to their maximum design requirement.

When $T_0$ is equal to or less than $T_7$, and when the actual room temperature (hereinafter referred to as $T_{11}$) is above or at a point which is less (say 5° F.) than the desired room temperature (hereinafter $T_{10}$ designates said point), as determined by thermoswitch 30, a portion (hereinafter referred to as the first portion) of the flow of material 2 is free to circulate in a separate loop directed by means of thermoswitches 25 and 47 through connections 42, 50 and 54 as follows: Valves 5C–B, 11F–E. Starting at valve 5 said first portion of material 2 flows through conduit 6, through heat exchanger 8, heating the space to be heated, as required, by means of fan 9 controlled, as above described, by thermoswitch 30 through connection 31. The said first portion after giving up heat in exchanger 8 returns in a cooled state by gravity via conduit 33, valve 11F–E and conduit 12, to coil 14 where it is heated by material 1, and passes through conduit 17 to valve 5C–B, where it begins its cycle over again. This circulation occurs because of the relatively greater density of the cooled part of said first portion of material 2 compared to the density of its heated part. (Pump means may be added, if desired, to promote this circulation.)

While the first portion of material 2 circulates as described above the flow of the other portion of material 2

(hereinafter referred to as the second portion) is directed as follows: Valves 5A–D, 20J–M, 28R–N. When T₀ exceeds T₂, as determined by thermoswitches 23 and 25, this second portion is conducted from outdoor heat exchange surface 16 via conduit 4 through valve 5A–D, by conduit 7 to container 18, delivering its heat thereto, whence it is conducted through conduit 19, valve 20J–M, conduit 21 to pump 22, returning via conduit 27, valve 28R–N, and conduit 29 to the outdoor heat exchange surface 16 to begin its cycle over again. When T₀ is less than T₂, pump 22 is turned off by means of thermoswitches 23 and 25 by connections 24 and 26 respectively, and the second portion of fluid 2 remains relatively quiescent in the above described circuit.

When T₀ is equal to or less than T₇ as above, but when the actual room temperature T₁₁ is less than T₁₀, as determined by thermoswitch 30, the first portion of material 2 remains relatively quiescent in the following circuit: outdoor heat exchange surface 16, conduit 4, valve 5A–D, conduit 7, container 18, conduit 19, valve 20J–L, conduit 51, valve 28S–N, and conduit 29. The second portion of material 2 flows through the following circuit: Valves 5C–B, 11F–G, 20K–M, 28R–P, 11H–E. The direction of said latter flow is now as follows: From conduit 6 through heat exchanger 8, conduit 33, valve 11F–G, conduit 13, valve 20K–M, conduit 21, to pump 22 and thence through conduit 27, valve 28R–P, conduit 34, valve 11–HE, and conduit 12, to coil 14 where it is heated as before, afterward passing through conduit 17 and valve 5C–B for recirculation.

During the heating cycle, the operation of the heat pump system and cycle is as follows: Compressor 35 discharges compressed heat transfer fluid 58 such as Freon (a chlorinated fluorinated hydrocarbon such as dichloro difluoro methane) or other suitable compressible heat transfer fluid, through conduit 36 which leads into coils 37 passing through the container 15 containing heat storage material 1, delivering its heat thereto. From the coils 37, conduit 38 leads the now cooled compressed heat transfer fluid to a receiver 39, thence through conduit 40 which passes through a heat exchanger 41. (Heat exchanger 41 is for the purpose of improving the efficiency of the heat pump cycle. Its use is optional.) The said compressed fluid 58 thence continues through conduit 40 to an expansion valve 43, thereby expanding it and causing a drop in its temperature, thence into coils 44 in container 18, where it absorbs heat from fluid 2. It then flows via conduit 45 through heat exchanger 41 (if the latter is used) to the compressor 35, where it is again compressed, to begin its cycle over again.

Operation of compressor 35 is controlled as follows: Thermoswitch controls 47 and 25, associated with containers 15 and 18 respectively, are connected as follows: Thermoswitch 47 connects directly to compressor 35 by means of lead 48. Thermoswitch 25 connects to thermoswitch 47 by means of lead 50. These thermoswitches serve to actuate the compressor in known manner and according to temperature conditions in the said containers, as hereinafter described.

The temperature points are selected as follows: Where it is indicated that heat storage material 1 in container 15 is completely fused, i. e. when its temperature T₁ is some selected minimum amount (say 5°) above its fusion point, T₃, thermoswitch 47 stops compressor 35. This temperature is hereinafter referred to as T₁₂. Whenever heat storage material 1 in container 15 is completely solidified, as indicated by its temperature being at least 5° F. below T₃, showing that there is a substantially lesser amount of effective heat in storage, thermoswitch 47 starts compressor 35. This reduced temperature level, i. e. T₃ minus at least 5° F., is hereinafter referred to as T₈. Whenever T₁ equals, or is greater than, T₃, indicating that an appreciable amount of effective heat is in storage in material 1, even though the latter may not be completely fused, and when at the same time T₂ is indicated by thermoswitch 25 to be at or above a selected minimum temperature (hereinafter referred to as T₄) for efficient operation of the heat pump cycle, for example above 40° F., then compressor 35 is actuated by thermoswitches 47 and 25 in series. Whenever T₁ exceeds T₈, and when T₂ falls below T₄, compressor 35 stops. When T₁ equals or is less than T₈, compressor 35 operates irrespective of all other temperature conditions.

The cooling cycle will now be described. The outdoor heat exchange surface 16 in this case functions as a dissipator of heat by radiation and convection, usually at night. Valves 5, 11, 20 and 28 are set manually or automatically, and material 2 is thereby divided into two portions, each in its own closed loop, during the cooling cycle.

Course 5C–A, 28N–P, and 11H–E, is the path of the first portion of said material 2. Said portion passes through coils 3 and thence at a reduced temperature through conduit 29, valve 28N–P, conduit 34, valve 11H–E, and conduit 12 to coil 14, absorbing heat from material 1, thence through conduit 17, valve 5C–A and conduit 4 to coils 3 of outdoor heat exchange surface 16 where its cycle begins over again. This circulation proceeds by gravity whenever T₁ is greater than T₀.

Course 5B–D, 20J–M, 28R–S, 25L–K, and 11G–F is the path of the other portion of material 2 hereinafter referred to as the second portion. On leaving heat exchanger 8, this second portion passes through conduit 6, valve 5B–D, and conduit 7 into container 18 where it mixes with the main body of material 2. Cooled material 2 flows from said main body through conduit 19, valve 20J–M, and conduit 21 to pump 22, and thence through conduit 27, valve 28R–S, conduit 51, valve 20L–K, conduit 13, valve 11G–F, and conduit 33 to heat exchanger 8, whence it is recycled. Material 2 thus absorbs heat from air 49 returning by duct 10 from the space to be cooled, by operation of fan 9 controlled by thermoswitch 30 in response to the requirements of said space.

The flow of this second portion of material 2 is controlled as follows: Whenever the actual room temperature T₁₁ exceeds T₁₀, the pump is turned on by thermoswitch 30 through connection 32. Whenever T₁₁ equals, or is less than, T₁₀, the pump is turned off by the same means.

During the cooling cycle the course followed by the compressed heat transfer fluid 58 in the heat pump system is the same as described above under the heating cycle, although the compressor 35 is actuated by different temperature conditions as indicated below. The control of the compressor 35 is now as follows: Thermoswitch 25 through connection 52 turns on compressor 35, whenever T₂ exceeds a predetermined high temperature limit, hereinafter referred to as T₅ (for example, 50° F.) and turns off whenever T₂ falls below a predetermined low temperature herein referred to as T₆ (for example, 30° F.). Whenever T₂ is equal to, or less than, T₅, compressor 35 also is turned off by thermoswitch 47 whenever T₁ equals T₉. Compressor 35 is turned on by thermoswitches 25 and 47 at intermediate temperatures between the above described high and low temperature limits of T₂ whenever T₁ falls below T₈.

We claim:
1. A system comprising, in combination, a space to be temperature-conditioned, a first medium which is adapted to store and transfer heat and which is in fluid form, a separate second medium which is adapted to store heat and which has a transition point from liquid to solid phase and vice versa which is at least 10° F. above the desired temperature of said space and which passes through said transition point during normal operations of said system, a container in which said second medium is stored and confined, a compressible normally gaseous fluid, and a surface arranged to receive solar radiation, a compressor for compressing said gaseous fluid, conduit means for conveying said compressed gaseous fluid into out-of-contact heat exchange relation with said second medium, means for expanding said compressed gaseous fluid, conduit means for conveying said expanded gaseous fluid into out-of-contact heat exchange relation with said first medium, and for returning said fluid thereafter to said compressor for recompression therein, and conduit means for directing said first medium from said surface into out-of-contact heat exchange relation with said space, said second medium, said compressed gaseous fluid, and said expanded gaseous fluid and thence back to said surface.

2. A system in accordance with claim 1, further characterized in that means are provided for shutting off said compressor when the temperature of said second medium exceeds a predetermined point which is at least 5° F. in excess of its transition point.

3. A system in accordance with claim 1, further characterized in that means are provided for shutting off said compressor when the temperature of said second medium exceeds a predetermined point which is at least 5° F. in excess of its transition point, and for actuating said compressor when the temperature of said second medium falls below said predetermined point.

4. A system comprising, in combination, a space to be temperature-conditioned, a first medium which is adapted to store and transfer heat and which is in fluid form, a separate second medium which is adapted to store heat and which has a transition point from liquid to solid phase and vice versa which is at least 10° F. above the desired temperature of said space and which passes through said transition point during normal operations of said system, a container in which said second medium is stored and confined, a compressible gaseous fluid, a surface arranged to receive solar radiation, a first reservoir adapted to contain said second medium, a second reservoir adapted to contain a body of said first medium, a first passageway and a second passageway in said first reservoir, a single passageway in said second reservoir, a compressor for compressing said gaseous fluid, means for actuating said compressor when the temperature of said second medium in said first reservoir is more than about 5° F. below its transition point, conduit means for conveying compressed gaseous fluid from said compressor to one end of said first passageway, conduit means for conveying said gaseous fluid from the other end of said first passageway to one end of said single passageway, expansion means in said last-named conduit means for expanding said gaseous fluid and thereby reducing its temperature, conduit means for conveying said cooled expanded gaseous fluid from the other end of said single passageway to said compressor for recompression therein, means for directing said first medium from said surface into heat exchange relation with said space, through said second passageway, through said second reservoir, and thence back to said space, said last-named means comprising a pump arranged to be actuated when the temperature of said surface is in excess of the temperature in said second reservoir and to be shut off when the temperature of said surface is below the temperature in said second reservoir.

5. A system in accordance with claim 4, further characterized in that said pump is also arranged to be shut off when the temperature in said second reservoir is in excess of about 120° F.

6. A system of the class described comprising a surface adapted to receive solar radiation, a body of heat storage medium, a container in which said heat storage medium is stored and confined, a space to be temperature-conditioned, a heat transfer medium separate from said heat storage medium, a compressible gaseous fluid, and a compressor for compressing said fluid; means for circulating said heat transfer medium through said surface to heat said heat transfer medium, means for circulating said heat transfer medium into out-of-contact heat exchange relation with said space and with said heat storage medium to supply heat to both of them, and means for actuating said compressor to compress said gaseous fluid and thereby heat the same and means for bringing said heated compressed gaseous fluid into out-of-contact heat exchange relation with said heat storage medium to heat the latter when the temperature of the latter falls below a predetermined point, said heat storage medium having a transition point from liquid to solid phase and vice versa which is at least 10° F. above the desired temperature of said space and passing through said transition point during normal operations of said system.

7. A system of the class described comprising a surface adapted to receive solar radiation and to dissipate heat to the external environment, a space to be temperature-conditioned, a heat storage medium, a container in which said heat storage medium is stored and confined, a heat transfer medium separate from said heat storage medium, a compressible gaseous fluid, and a compressor for compressing said fluid; means for circulating said heat transfer medium through said surface to modify the temperature of said medium and then into out-of-contact heat exchange relation with said space and with said heat storage medium to modify the temperature of said space and of said heat storage medium; a closed circuit for said compressible gaseous fluid comprising said compressor and an expansion valve, means for actuating said compressor to compress and thereby heat said gaseous fluid and to cause said fluid to move through said circuit and through said expansion valve thereby expanding and cooling said fluid, and heat-exchange means for bringing said fluid into out-of-contact heat exchange relation with said heat-transfer medium to modify the temperature of the latter, said heat storage medium having a transition point from liquid to solid phase and vice versa which is at least 10° F. above the desired temperature of said space and passing through said transition point during normal operations of said system.

8. A system in accordance with claim 7 wherein said last-mentioned heat-exchange means comprises a heat exchanger wherein said heat transfer medium flows in out-of-contact heat exchange relation with the cooled expanded gaseous fluid.

9. A system in accordance with claim 7 wherein said last-mentioned heat-exchange means comprises a heat exchanger wherein said heat transfer medium flows in out-of-contact heat exchange relation with the heated compressed gaseous fluid.

10. A system in accordance with claim 7 wherein said last-mentioned heat-exchange means comprises a first heat exchanger wherein said heat transfer medium flows in out-of-contact heat exchange relation with the cooled expanded gaseous fluid, and a second heat exchanger wherein said heat transfer medium and said heated compressed gaseous fluid flow in out-of-contact heat exchange relation with each other and with a mass of said heat storage medium.

References Cited in the file of this patent

UNITED STATES PATENTS

| Number | Name | Date |
|---|---|---|
| 1,969,187 | Schutt | Aug. 7, 1934 |
| 2,396,338 | Newton | Mar. 12, 1946 |
| 2,544,474 | Swanton | Mar. 6, 1951 |
| 2,575,478 | Wilson | Nov. 20, 1951 |
| 2,584,573 | Gay | Feb. 5, 1952 |